Figure 4:
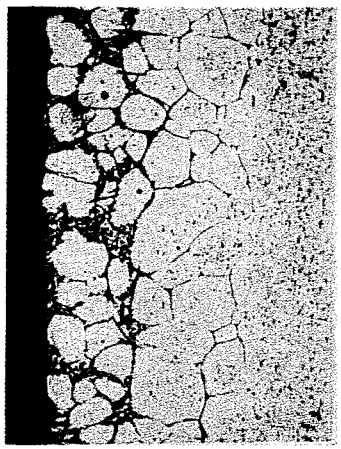

Jan. 28, 1958 M. A. MILLER 2,821,014
COMPOSITE ALUMINOUS METAL ARTICLE
Filed May 31, 1951 2 Sheets-Sheet 1

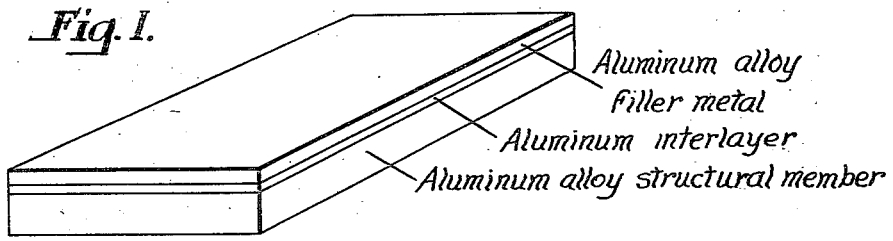

Fig. 1.
Aluminum alloy filler metal
Aluminum interlayer
Aluminum alloy structural member

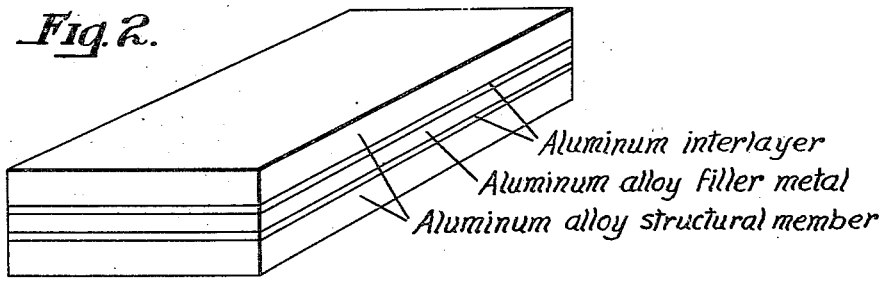

Fig. 2.
Aluminum interlayer
Aluminum alloy filler metal
Aluminum alloy structural member

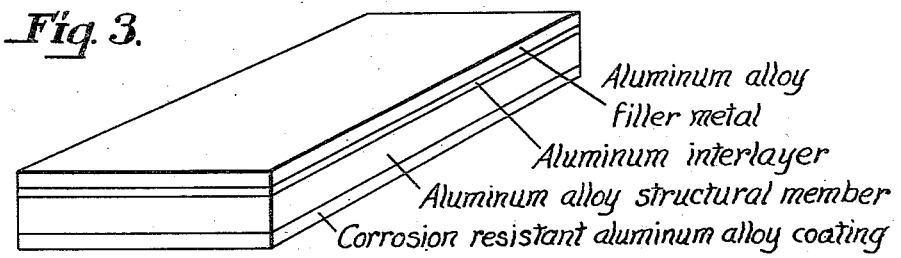

Fig. 3.
Aluminum alloy filler metal
Aluminum interlayer
Aluminum alloy structural member
Corrosion resistant aluminum alloy coating INVENTOR
Mike A. Miller
BY George B. Todd
ATTORNEY

United States Patent Office 2,821,014
Patented Jan. 28, 1958

2,821,014

COMPOSITE ALUMINOUS METAL ARTICLE

Mike A. Miller, New Kensington, Pa., assignor to Aluminum Company of America, Pittsburgh, Pa., a corporation of Pennsylvania Application May 31, 1951, Serial No. 229,130

9 Claims. (Cl. 29—197.5)

This invention relates to a composite aluminous metal article designed for use in making assembled products by the brazing process. The term aluminous, as used herein, refers to both aluminum and those alloys in which that metal constitutes the major portion of the composition.

The brazing of aluminous products is a fusion joining process wherein an aluminum base alloy serves as the brazing filler metal and becomes fused while the parts being joined are not melted. In the latter respect brazing resembles soldering. The steps followed in making a brazed aluminous product consist essentially in assembling the parts to be joined in proper relationship to each other with the brazing filler metal at the interface between the parts where the joint is to be formed or at the edge of that region, so that the filler metal can flow into the interfacial space. A suitable flux is either applied to the area to be joined before any heating occurs or it may be supplied in the course of the brazing operation as in the dip brazing process. In either case, the assembly as a whole, or only that part where the joint is to be formed, is heated to a sufficiently high temperature to fuse the filler metal and permit it to establish a bond with the adjoining structural members. Following the fusion step the assembly is cooled to room temperature. The brazing process, as will be appreciated, is well adapted to forming an entire assembled product in a single operation regardless of the number or length of joints and the process may be carried out in a continuous manner, that is, the parts may be assembled and continuously fed into a furnace or bath where fusion of the filler metal is effected.

Generally, the brazing of aluminous articles is conducted within the temperature range of 1040 to 1180° F. because the most suitable aluminum base alloy filler metals melt within this range. The choice of brazing temperature employed in any particular case is usually determined by the melting point of the structural member and the brazing filler metal. Some aluminum base alloys which possess very desirable properties at room temperature cannot be heated to brazing temperatures without causing melting of some constituents while other alloys may withstand the heating but combine with the liquid brazing filler metal to form a low melting point constituent. As a result, the choice of alloys for structural members has been restricted to very few compositions.

It has been found that although certain aluminum base alloys which contain magnesium, possess higher strengths than aluminum and the common aluminum-1.25% manganese alloys, and are able to withstand heating to the brazing temperatures without melting, they nevertheless suffer from a susceptibility to penetration by the commercial molten brazing filler metal alloys containing a substantial amount of silicon, with or without additions of copper and/or zinc. The molten metal or low melting point products formed by combination with the structural alloy member appear to penetrate the member along its grain boundaries thereby weakening it. The danger of penetration is especially acute where it is necessary to make brazed structures having thin walls such as found in radiators or other heat exchangers.

It is an object of this invention to provide a composite aluminous article adapted for use in making of stronger brazed assemblies. Another object is to provide a composite article having a structural member associated with a layer of brazing filler metal which can be brazed without danger of any substantial penetration of the structural member. Another object is to provide a composite aluminous article which is substantially free from penetration of the structural portion of the article by molten aluminum-silicon type alloy filler metal during the brazing operation. A further object is to provide a relatively thin composite article having a structural member associated with a layer of aluminum-silicon type of brazing filler metal that can be brazed under normal conditions without danger of perforation by the fused filler metal. Another object is to utilize aluminum base alloys containing magnesium as the structural component of a composite article in association with a layer of aluminum-silicon type brazing filler metal and yet avoid substantially any penetration by the fused filler metal during a brazing operation.

These objects and others are attained in a composite aluminous metal article wherein the structural member portion is an aluminum base alloy penetratable by fused brazing filler metal and is separated from an associated filler metal layer portion by a relatively thin interlayer of aluminum or an aluminum base alloy having a melting point above that composing the structural member. The interlayer should not be less than 0.0010 in., and preferably not less than 0.0015 in., in thickness, and should be adhesively joined to both the structural member and filler metal layer. In particular, I have found that those magnesium-containing alloys of the aluminum-magnesium, aluminum-magnesium-silicon, and aluminum-magnesium-zinc types having melting points above about 1080° F., can be succesfully used as the structural portion of a composite article in association with a brazing filler metal component of the aluminum-silicon alloy type and yet avoid in very substantial measure any penetration and resultant weakening of the structural member by the fused filler metal when the article is brazed if a very thin layer of aluminum or high melting point aluminum base alloy resistant to absorption is interposed between the two components and adhesively joined to each of them. In addition to inhibiting penetration the presence of the interlayer serves to promote the flow of brazing filler metal to the region of the brazed joint and thus permit the formation of better fillets because little or none of the filler metal is absorbed by the structural member.

It is to be understood that the penetration referred to herein designates the intrusion of the structural component by the fused brazing filler metal and not a general melting of the alloy constituting the structural component. Furthermore, this penetration is not to be confused with the diffusion phenomenon in solid metals which is concerned with the migration of individual atoms from one region to another, generally in response to a difference in concentration of the atoms in different parts of the metal body. The resistance to absorption exhibited by the interlayer refers to the resistance to melting of the interlayer in contact with the fused filler metal and that it does not contain any elements which might combine with those in the filler metal to form a low melting point constituent.

The structural component of the composite article consists of an aluminum base alloy that does not fuse at the brazing temperature but is susceptible to penetration by the fused brazing filler metal associated therewith. In particular, the structural component consists of an aluminum base alloy containing from 0.1 up to 5% magnesium, with or without the addition of other elements providing the resultant composition does not melt below about 1080° F. and in no event below the melting point of the brazing filler metal. In making aluminum-magnesium alloys it is my preferred practice to employ from 0.5 to 2.5% magnesium. If silicon is to be included in the alloy the amount used should be between 0.25 and 0.8% and the magnesium content limited to the range of 0.5 to 1.5%. Preferably, the proportion of magnesium to silicon should be that found in the intermetallic compound $Mg_2Si$ or very close to that proportion. If zinc is added the amount should be less than 6% but more than 0.1% and preferably within the range of 2.5 to 5% while the magnesium content should preferably constitute 0.5 to 2.0% of the weight of the alloy. In addition to silicon and zinc, copper, manganese and chromium may be employed in the following proportions: 0.10 to 2.0% copper, 0.25 to 1.5% manganese and 0.1 to 0.5% chromium. The copper, manganese and chromium may also be used in the absence of silicon and zinc. Furthermore, any of the well-known grain refining elements such as titanium, boron, zirconium, columbium, tantalum, vanadium, molybdenum and tungsten may be included in any of the alloys in a total amount not exceeding 0.5%. Beryllium may also be included in amounts of 0.005 to 0.02%.

The interlayer may be composed of aluminum having a maximum total iron and silicon impurity content of 0.8%. In place of aluminum certain aluminum base alloys may be employed which have melting points above that of the structural component alloy and which are resistant to absorption by the fused brazing filler metal. Such alloys should have a high melting point, generally, not lower than about 1180° F. Also, the alloy and the aluminum should be as fine grained as possible. Examples of suitable aluminum alloys which can serve as interlayer material are aluminum-0.005 to 0.10% beryllium, aluminum-0.01 to 1.5% manganese and aluminum-0.05 to 0.25% copper. For the purpose of convenient designation the interlayer material may be referred to as an aluminous interlayer resistant to absorption of the filler metal since it may be composed of either aluminum or a suitable aluminum base alloy.

The brazing filler metal component of the composite article should consist of any suitable aluminum base alloy having a sufficiently low melting point, the metal flow characteristics and other qualities essential to forming a satisfactory brazed joint. In general, aluminum base alloys containing 5 to 15% silicon, with or without additions of 1 to 10% zinc or 0.2 to 5% copper, or both, are very satisfactory. It is to be understood that other metals such as nickel, germanium and magnesium may be added to enhance certain properties of the filler metal alloy providing they do not alter the basic properties of the aluminum-silicon composition.

Figure 5:
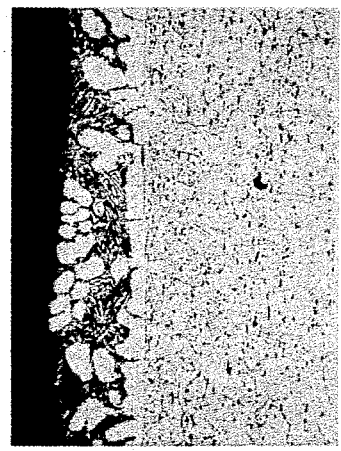
Figure 6:
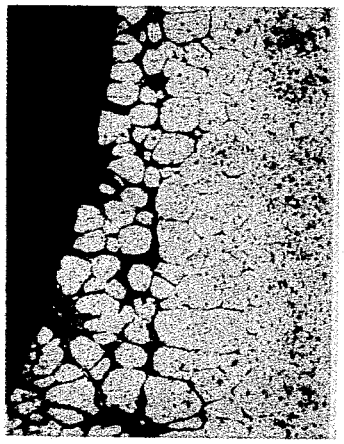

For a better understanding of my invention reference is made to the accompanying figures where, Fig. 1 is an enlarged perspective view and cross section of a three layer sheet; Fig. 2 is a similar view of a five layer sheet; Fig. 3 is a modification of Fig. 1 having four layers; Fig. 4 is a photomicrograph, at a magnification of 100 diameters, of a typical section of a composite sheet having no interlayer which had been heated to brazing temperature; Fig. 5 is a photomicrograph at the same magnification of a section of a similar sheet with an interlayer heated to the same temperature; Fig. 6 is a photomicrograph, at a magnification of 100 diameters, of a section of a brazed T joint where no interlayer was present and Fig. 7 is a photomicrograph at the same magnification of a similar section of a T joint where an interlayer was present.

As indicated by the legends in Figs. 1, 2 and 3 the aluminum interlayer in the composite sheets separates the aluminum alloy structural members from the aluminum base alloy brazing filler metal layer and is co-extensive with the filler metal. The composite sheet may have but one structural member, as in Fig. 1, covered on one side by an interlayer and associated brazing filler metal, or the filler metal layer may be placed between two structural members with intervening interlayers as shown in Fig. 2. The three layer sheet shown in Fig. 1 may be modified by the addition of a corrosion resistant coating of aluminum or aluminum base alloy as illustrated in Fig. 3. Such a four layer sheet is of special value where one side of the article in service is in contact with a corrosive fluid as in radiators or other heat exchangers. An alloy layer having other characteristics than resistance to corrosion such as higher hardness, wear resistance or other properties may be substituted for the fourth layer. It will be understood that other combinations and arrangements of the three essential components may be made as long as an interlayer of adequate thickness separates the filler metal from the structural member.

Figs. 4, 5, 6 and 7 show the appearance of a portion of a typical cross section, including the brazing filler metal surface, of similar composite sheets of aluminum-1.2% magnesium and aluminum-10% silicon alloys after the sheets were subjected to brazing conditions. In each case the composite sheet was 0.064" in thickness. The aluminum-silicon alloy layer constituted about 10.5% of the total thickness of the composite sheet while the aluminum interlayer seen in Figs. 5 and 7, was 0.00238" in thickness and represented 4% of the total thickness. The sheets illustrated in Figs. 4 and 5 were placed in a horizontal position with the filler metal on top, in a circulating air furnace heated to 1120° F., held for 2 minutes in the furnace, removed and cooled to room temperature thus simulating conditions prevailing in furnace brazing practice. It will be seen in Fig. 4 that the fused aluminum-silicon alloy has penetrated the aluminum-magnesium alloy member along grain boundaries to a depth about equal to that of the original filler metal layer. The penetration produced a brittle, low melting point constituent that had an adverse effect upon the properties of the brazed product. In contrast to the condition seen in Fig. 4 is that illustrated in Fig. 5 where the aluminum interlayer prevented any penetration of the structural member.

Figure 7:

Figs. 6 and 7 show the same composite sheet materials when used to form a brazed T joint with a sheet of aluminum. The composite sheets and the aluminum cross members were assembled in an inverted T shape, the composite sheet being in vertical position with the aluminum sheet at the bottom. The assembly was immersed for 2 minutes in a conventional fused salt flux bath held at a temperature of 1120° F. At the end of that period the assembly was withdrawn and cooled to room temperature. This operation followed the practice commonly used in brazing by the dip method. The penetration of the structural member is evident in Fig. 6 and the absence of penetration is to be noted in Fig. 7. Since no filler metal was lost by penetration of the aluminum-magnesium alloy more was available for forming the fillet in the T joint, or, as referred to hereinbelow, the flow of filler metal was increased where an aluminum interlayer was employed.

The composite article, it will be readily appreciated may have any shape which is convenient for brazing. For example, the article may be in the form of a sheet, plate or tube, or it may have a more complex contour such as imparted by drawing, pressing, stamping or the like. Also, it may have a shape imparted by extrusion, forging or hot pressing. Furthermore, the shape may be determined by the configuration of a cast structural component. Any type and shape of structural component may be employed provided the aluminous interlayer is firmly bonded thereto and to the brazing filler metal layer. The aluminous interlayer must cover at least a portion of the surface of the structural member and the filler metal layer must not extend beyond it if penetration of the structural member is to be avoided.

Moreover, the interlayer, filler metal and structural component may be arranged in any sequence or order as indicated in Figs. 1, 2 and 3. Although there may be two or more structural members of a composite article, all of them are collectively referred to herein as a structural component. The specific arrangement of the several parts is a matter of choice depending upon the ultimate use of the composite article.

Where a corrosion resistant alloy is employed as a fourth component, a number of known compositions may be used such as described in U. S. Patents 1,997,165 and 1,997,166 providing the melting point is high enough to avoid melting at brazing temperatures.

The total thickness of the composite article can be varied according to the requirements of the brazed assembly. Ordinarily, when in the form of sheet, the total thickness is not likely to exceed about 0.100", however, the article will have a greater thickness if the structural member is a plate, rod, forging or casting. In any case the brazing filler metal should constitute but a relatively small part of the total cross sectional thickness of the article inasmuch as only a small amount is required to supply metal for the brazed joints. The thickness of the layer for any given composite article, will be determined by the amount needed to form a joint with proper fillet. Generally, a layer or coating which constitutes from 5 to 20% of the total thickness of the article is adequate if the structural member is a sheet or plate or of a thickness equivalent to sheet or plate.

The aluminum interlayer should be thick enough to prevent any substantial penetration to the structural member by the fused brazing filler metal under normal brazing conditions, but under no circumstances should the thickness be less than 0.001 in., and preferably not less than 0.0015 in., since a thinner layer does not afford adequate protection. Furthermore, it need not exceed 10% of the total thickness of the composite article. In most cases the interlayer should be thinner than the adjoining filler metal layer and usually should constitute from 2 to 10% of the total thickness of the article. The structural member or members or layer of other aluminum base alloy should comprise the remainder of the composite article and generally this amounts to 60 to 95% of the total thickness.

The effectiveness of the interlayer is very surprising in view of its extreme thinness. For example, if molten aluminum-silicon alloy, within the brazing temperature range, is brought into contact with ordinary aluminum foil, of say 0.002 to 0.003 inch in thickness, coated with a brazing flux, the liquid metal will very quickly alloy with and absorb that foil within a period no longer than that employed in forming a brazed joint. However, an interlayer of aluminum of the same or lesser thickness in a composite article as herein defined, in the presence of the same flux at the same temperature and within the same period of time, will not be completely absorbed by the fused aluminum-silicon type alloy. The reason for this difference in performance is not clear, but there is no doubt about the effectiveness of the interlayer is protecting the structural component.

The protective aluminous interlayer is adhesively joined to the structural component in any known manner providing it becomes firmly attached thereto, preferably by means of a metallurgical bond. The best results are obtained if an integral bond is established under the influence of heat and pressure. Thus, the aluminum or proper aluminum base alloy in sheet or plate form may be rolled or pressed onto the base component, if the shape permits it. Also, a duplex ingot may be produced by casting the strutcural alloy against a slab of aluminum or aluminum base alloy, or, the reverse procedure may be followed if proper thermal conditions are created and the composite ingot worked to the desired shape. In some cases, a sprayed aluminous coating may be found to be satisfactory, especially if subsequently compacted on the underlying metal. Application of the coating by casting or spraying is particularly suitable where the structural member is a casting.

The brazing filler metal layer may then be adhesively joined to the aluminous coated structural member according to any of the procedures described above. While it is possible to apply each layer successively as has been mentioned, it is generally more economically in the case of sheet and plate to provide the filler metal layer with the desired aluminous coating on one of two sides, depending on character of the composite article, and then bond it to the structural component under the influence of heat and pressure. Thus, the filler metal body can be rolled to slab dimensions and the aluminous interlayer material applied thereto by a hot rolling operation. The method of forming the composite article, it should be understood, does not constitute a part of my invention.

The advantages of employing an aluminous interlayer in a composite article are illustrated in the following examples in which different alloys were used as structural members. The nominal composition of the several alloys is listed in Table I.

TABLE I

*Percentage composition of structural member alloys*

| Alloy | Mg | Si | Cu | Mn | Zn |
|---|---|---|---|---|---|
| A | 0.8 | | | | |
| B | 1.2 | | | | |
| C | 1.0 | | | 1.2 | |
| D | 0.60 | 0.35 | 0.25 | | |
| E | 1.0 | | | 1.5 | 4.0 |

The composite samples used in the first series of tests consisted of sheet 0.064" in thickness. In all cases but the last two, a brazing filler metal of an aluminum-10% silicon alloy was present on one side of the structural member. In the last example involving alloy E, the brazing filler metal consisted of an aluminum-7.5% silicon alloy which was present on both sides of the core member. The samples were prepared by rolling the components together and thus establishing a firm bond between them. Half of the samples contained no aluminum interlayer while the balance had such an interlayer between the filler metal and structural member. The test consisted of heating the samples to 1120° F. for a period of 2 minutes followed by cooling in air to room temperature to simulate the conditions prevailing in brazing operations. The samples were microscopically examined to determine the average penetration of the structural member by the filler metal. The thickness of the interlayer, the filler metal layer and the average penetration of the structural member brought about by heating are given in Table II below.

TABLE II

*Penetration of structural member*

| Structural Alloy | Thickness of Interlayer, Inches | Percent of Total Thickness | Thickness of Filler Metal, Inches | Percent of Total Thickness | Average Penetration, Inches |
|---|---|---|---|---|---|
| A | None | 0 | 0.00784 | 12.2 | 0.0042 |
| A | 0.00224 | 3.5 | 0.00784 | 12.2 | 0.0000 |
| B | None | 0 | 0.00672 | 10.5 | 0.0075 |
| B | 0.00238 | 4.0 | 0.00672 | 10.5 | 0.0000 |
| C | None | 0 | 0.0068 | 10.6 | 0.0056 |
| C | 0.0051 | 8.0 | 0.0072 | 11.2 | 0.0000 |
| D | None | 0 | 0.0070 | 10.9 | 0.0017 |
| D | 0.0053 | 8.8 | 0.0070 | 10.9 | 0.0000 |
| E | None | 0 | 0.005 (each side) | 7.8 | 0.0052 |
| E | 0.0023 (each side) | 3.6 | 0.005 (each side) | 7.8 | 0.0000 |

It is apparent that the interlayer completely prevented the penetration of the structural member by the fused filler metal. The microscopic appearance of a cross section of the samples involving structural alloy B may be seen in Figs. 4 and 5.

The penetration referred to above is not only evident upon microscopic examination but its effect is also revealed in the reduced elongation values of the heated composite sheet. This is illustrated by the tensile test results obtained on a portion of the material listed in Table II under the structural alloys A, B, C and E. The properties of the sheet having alloy E as a component were obtained 4 weeks after being heated to the brazing temperature.

TABLE III

*Tensile properties of heated composite sheet*

| Structural Alloy | Interlayer | Tensile Strength, p. s. i. | Percent Elongation |
|---|---|---|---|
| A | No | 17,350 | 4.0 |
| A | Yes | 17,350 | 11.5 |
| B | No | 17,900 | 8.0 |
| B | Yes | 19,950 | 15.0 |
| C | No | 20,700 | 5.2 |
| C | Yes | 22,000 | 11.0 |
| E | No | 36,300 | 7.8 |
| E | Yes | 42,050 | 17.0 |

The low elongation values of the samples having no interlayer reveal the very pronounced effect of partial penetration of the structural members and that the intergranular penetration shown in Figs. 4 and 6 embrittles the aluminum-magnesium alloys. The increased strength exhibited by examples of B, C and E alloys having interlayers is also indicative of an advantage that may be gained in some instances by preventing penetration of the structural member.

The thickness of the aluminum interlayer has an important bearing upon penetration of the structural member of a composite sheet. This is to be seen in the following examples where a five component sheet was used as illustrated in Fig. 2. The structural members were composed of alloy E and the filler metal consisted of an aluminum-13% silicon alloy. The composite sheet in each case had a total thickness of 0.064", but the thickness of the interlayer was varied. The composite sheet samples were brazed to an aluminum base in the form of a T joint by immersing the T assembly for a 2 minute period in a fused salt flux bath maintained at a temperature of 1100° F. The thickness of the interlayer, filler metal and average penetration of the structural member are given below in Table IV.

TABLE IV

*Effect of thickness of interlayer on penetration*

| Thickness of Interlayer | | Thickness of Filler Metal | | Average Penetration, Inches |
|---|---|---|---|---|
| Inches | Percent of Total Thickness | Inches | Percent of Total Thickness | |
| 0.0002 | 0.3 | 0.0047 | 7.3 | 0.0045 |
| 0.0007 | 1.1 | 0.0047 | 7.3 | 0.0021 |
| 0.0026 | 4.1 | 0.0046 | 7.2 | 0.0000 |
| 0.0036 | 5.6 | 0.0045 | 7.1 | 0.0000 |

The effect of the presence of an interlayer upon the flow of filler metal may be seen in the following examples involving the structural alloys B, C, D and E. In the first three cases the filler metal layer was composed of an aluminum-10% silicon alloy on one side of the composite sheet while the alloy E structural member was coated on both sides with an aluminum-7.5% silicon alloy. The tests were made by brazing T joints as described in connection with Figs. 6 and 7. The flow of metal was determined by calculating the volume of filler metal initially present in the layer on the composite sheet prior to heating and the volume of the metal in the fillet of the joint following heating. The percentage of the initial volume of the filler metal found in the fillet was considered to be a measure of the amount of flow that had taken place. The results of these tests are given below in Table V.

TABLE V

*Flow of filler metal*

| Structural Alloy | Sheet Thickness, Inches | Percent Flow of Filler Metal | |
|---|---|---|---|
| | | No Interlayer | With Interlayer |
| B | 0.064 | 34 | 52 |
| C | 0.012 | 10 | 62 |
| C | 0.064 | 35 | 57 |
| D | 0.012 | 34 | 39 |
| D | 0.064 | 37 | 47 |
| E | 0.064 | 0 | 32 |

The benefit from use of the aluminum interlayer extends over a range of brazing temperatures as demonstrated by the following examples of 0.064" thick composite sheet made with alloy E as the structural member. Both sides of the member were covered with an aluminum-7.5% silicon layer, 0.005" in thickness. The aluminium interlayer was 0.0023" in thickness or 3.6% of the total thickness of the composite sheet. The samples were heated for two minutes at the temperatures indicated in the table below in a fused salt flux bath. Following the heating the samples were cooled in air to room temperature. The penetration and flow of filler metal are given in Table VI below.

TABLE VI

*Effect of temperature on penetration and flow of filler metal*

| Temperature, °F. | Total Penetration | | Percent Flow of Filler Metal | |
|---|---|---|---|---|
| | No Interlayer, Inches | With Interlayer, Inches | No Interlayer | With Interlayer |
| 1,080 | 0.0041 | 0.0000 | 0 | 21.5 |
| 1,100 | 0.0043 | 0.0000 | 0 | 25 |
| 1,120 | 0.0052 | 0.0000 | 0 | 32 |
| 1,130 | 0.0074 | 0.0000 | 0 | 60 |

Having thus described my invention and certain embodiments thereof, I claim:

1. A composite aluminous metal article adapted to be joined to another metallic body by the brazing process, said article having a structural component consisting of an aluminum base alloy that has a melting point not lower than 1080° F. and is susceptible to penetration by molten brazing filler metal; a thin aluminous interlayer at least 0.0010" in thickness and constituting from 2 to 10% of the total thickness of the composite article, said interlayer extending over at least a portion of the surface of said structural component and adhesively joined thereto, said interlayer also having a melting point not lower than 1180° F. and above that of the structural component; and a layer of brazing filler metal adhesively joined to said interlayer composed of an aluminum base alloy having a melting point below that of the structural component, said brazing filler metal being completely separated from said structural component by said interlayer, said composite article being characterized by substantial freedom from penetration of the structural component by molten filler metal during the brazing process.

2. A composite aluminous metal article adapted to be joined to another metallic body by the brazing process, said article having a structural component consisting of an aluminum base alloy containing 0.1 to 5% magnesium as the essential added alloy component and the balance substantially aluminum, said alloy having a melting point not lower than 1080° F. and susceptible to penetration by molten brazing filler metal; a thin aluminous interlayer at least 0.0010" in thickness and constituting from 2 to 10% of the total thickness of the composite article, said interlayer extending over at least a portion of the surface of said structural component and adhesively joined thereto, said interlayer also having a melting point not lower than 1180° F. and above that of the structural component; and a layer of brazing filler metal adhesively joined to said interlayer composed of an aluminum base alloy containing from 5 to 15% silicon as the essential added alloy component and the balance substantially aluminum and having a melting point below that of the structural component, said brazing filler metal being completely separated from said structural component by said interlayer, said composite article being characterized by substantial freedom from penetration of the structural component by molten filler metal during the brazing process.

3. A composite aluminous metal article adapted to be joined to another metallic body by the brazing process, said article having a structural component consisting of an aluminum base alloy containing 0.5 to 1.5% magnesium and 0.25 to 0.8% silicon as the essential added alloy components and the balance substantially aluminum, said alloy having a melting point not lower than 1080° F. and susceptible to penetration by molten brazing filler metal; a thin aluminous interlayer at least 0.0010" in thickness and constituting from 2 to 10% of the total thickness of the composite article, said interlayer extending over at least a portion of the surface of said structural component and adhesively joined thereto, said interlayer also having a melting point not lower than 1180° F. and above that of the structural component; and a layer of brazing filler metal adhesively joined to said interlayer composed of an aluminum base alloy containing from 5 to 15% silicon as the essential added alloy component and the balance substantially aluminum and having a melting point below that of the structural component, said brazing filler metal being completely separated from said structural component by said interlayer, said composite article being characterized by substantial freedom from penetration of the structural component by molten filler metal during the brazing process.

4. A composite aluminous metal article adapted to be joined to another metallic body by the brazing process, said article having a structural component consisting of an aluminum base alloy containing 0.5 to 2.0% magnesium and 2.5 to 5.0% zinc as the essential added alloy components and the balance substantially aluminum, said alloy having a melting point not lower than 1080° F. and susceptible to penetration by molten brazing filler metal; a thin aluminous interlayer at least 0.0010" in thickness and constituting from 2 to 10% of the total thickness of the composite article, said interlayer extending over at least a portion of the surface of said structural component and adhesively joined thereto, said interlayer also having a melting point not lower than 1180° F. and above that of the structural component; and a layer of brazing filler metal adhesively joined to said interlayer composed of an aluminum base alloy containing from 5 to 15% silicon as the essential added alloy component and the balance substantially aluminum and having a melting point below that of the structural component, said brazing filler metal being completely separated from said structural component by said interlayer, said composite article being characterized by substantial freedom from penetration of the structural component by molten filler metal during the brazing process.

5. A composite aluminous metal article adapted to be joined to another metallic body by the brazing process, said article having a structural component consisting of an aluminum base alloy containing 0.1 to 5% magnesium and 0.25 to 1.5% manganese as the essential added alloy components and the balance substantially aluminum, said alloy having a melting point not lower than 1080° F. and susceptible to penetration by molten brazing filler metal; a thin aluminous interlayer at least 0.0010" in thickness of the composite article, said interlayer extending over at least a portion of the surface of said structural component and adhesively joined thereto, said interlayer also having a melting point not lower than 1180° F. and above that of the structural component; and a layer of brazing filler metal adhesively joined to said interlayer composed of an aluminum base alloy containing from 5 to 15% silicon as the essential added alloy component and the balance substantially aluminum and having a melting point below that of the structural component, said brazing filler metal being completely separated from said structural component by said interlayer, said composite article being characterized by substantial freedom from penetration of the structural component by molten filler metal during the brazing process.

6. A composite aluminous sheet metal article adapted to be joined to another metal body by the brazing process, said article having a structural component consisting of an aluminum base alloy that has a melting point not lower than 1080° F. and is susceptible to penetration by molten brazing filler metal, said structural component also comprising from 60 to 90% of the total thickness of said composite sheet; a thin aluminous interlayer of at least 0.0010" in thickness and constituting from 2 to 10% of the total thickness of the composite article and extending over at least a portion of the surface of said structural component and adhesively joined thereto, said interlayer having a melting point not lower than 1180° F. and above that of the structural component; and a layer of brazing filler metal adhesively joined to said interlayer composed of an aluminum base alloy containing from 5 to 15% silicon as the essential added alloy component and the balance substantially aluminum and having a melting point below that of the structural component, said layer of brazing filler metal comprising from 5 to 20% of the total thickness of the composite article, said brazing filler metal layer also being completely separated from said structural component by said interlayer, said composite sheet metal article being characterized by substantial freedom from penetration of the structural component by molten filler metal during the brazing process.

7. A composite aluminous metal article adapted to be joined to another metallic article by the brazing process, said article having a structural component consisting of an aluminum base alloy that has a melting point not lower than 1080° F. and is susceptible to penetration by molten brazing filler metal; a thin aluminous interlayer at least 0.0010" in thickness and constituting from 2 to 10% of the total thickness of the composite article, said interlayer extending over at least a portion of the surface of said structural component and adhesively joined thereto, said interlayer also having a melting point not lower than 1180° F. and above that of the structural component; a layer of brazing filler metal adhesively joined to said interlayer composed of an aluminum base alloy having a melting point below that of the structural component, said brazing filler metal being completely separated from said structural component by said interlayer; and a corrosion resistant aluminum base alloy layer adhesively joined to the opposite side of said structural component, said corrosion resistant alloy containing as the essential added alloy component at least one element which raises the solution potential of the alloy above that of aluminum, said component article being characterized by substantial freedom from penetration of the structural component by molten filler metal during the brazing process.

8. A composite aluminous metal article adapted to be joined to another metal article by the brazing process, said article consisting of five members in layer-like relationship to each other, a central brazing filler metal layer composed of an aluminum base alloy having a melting point below that of the structural members, a thin aluminous interlayer adhesively joined to both sides of said filler metal layer, said interlayer having a melting point not lower than 1180° F. and above that of the structural components, each interlayer having a thickness of at least 0.0010" in thickness and constituting from 2 to 10% of the total thickness of the composite article, and a structural member joined to each interlayer, said structural member consisting of an aluminum base alloy which has a melting point not lower than 1080° F. and is susceptible to penetration by molten brazing filler metal in the absence of the aforesaid interlayer, said composite article being characterized by substantial freedom from penetration of the structural component by the molten filler metal during the brazing process.

9. A composite aluminous metal article adapted to be joined to another metallic body by the brazing process, said article having a structural component consisting of an aluminum base alloy containing from 0.1 to 5% magnesium as an essential added alloy component and the balance substantially aluminum, said alloy having a melting point not lower than 1080° F.; a thin aluminous metal interlayer composed of metal of the class consisting of aluminum and an aluminum base alloy composed of aluminum and at least one of the metals beryllium, manganese and copper in the proportion of 0.005 to 0.1% beryllium, 0.01 to 1.5% manganese and 0.05 to 0.25% copper, said interlayer having a thickness of at least 0.0010" in thickness and consituting from 2 to 10% of the total thickness of the composite article, said interlayer extending over at least a portion of the surface of said structural component and adhesively joined thereto, said interlayer having a melting point not lower than 1180° F. and above that of the structural component; and a layer of brazing filler metal adhesively joined to said interlayer composed of an aluminum base alloy containing from 5 to 15% silicon as the essential added alloy component and the balance substantially aluminum and having a melting point below that of the structural component, said brazing filler metal being completely separated from the structural component by said interlayer, said composite article being characterized by a substantial freedom from penetration of the structural component by the molten filler metal during the brazing process.

References Cited in the file of this patent

UNITED STATES PATENTS

| | | |
|---|---|---|
| 1,865,089 | Dix | June 28, 1932 |
| 1,997,165 | Brown | Apr. 9, 1935 |
| 2,017,757 | Keller | Oct. 15, 1935 |
| 2,023,512 | Brown | Dec. 10, 1935 |
| 2,100,411 | Reuleaux | Nov. 30, 1937 |
| 2,122,535 | Nock | July 5, 1938 |
| 2,312,039 | Hoglund | Feb. 23, 1943 |
| 2,354,006 | Gauthier | July 18, 1944 |
| 2,383,511 | Reynolds | Aug. 28, 1945 |